(12) United States Patent
Kim et al.

(10) Patent No.: US 9,823,410 B2
(45) Date of Patent: Nov. 21, 2017

(54) LIGHT GUIDING PLATE AND METHOD FOR MANUFACTURING THE SAME AND BACKLIGHT SOURCE AND DISPLAY DEVICE COMPRISING THE SAME

(71) Applicant: BOE TECHNOLOGY GROUP CO., LTD., Beijing (CN)

(72) Inventors: Heecheol Kim, Beijing (CN); Yan Wei, Beijing (CN); Chao Xu, Beijing (CN); Chunfang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 456 days.

(21) Appl. No.: 14/361,058

(22) PCT Filed: Jun. 14, 2013

(86) PCT No.: PCT/CN2013/077254
§ 371 (c)(1),
(2) Date: May 28, 2014

(87) PCT Pub. No.: WO2014/166154
PCT Pub. Date: Oct. 16, 2014

(65) Prior Publication Data
US 2015/0160402 A1    Jun. 11, 2015

(30) Foreign Application Priority Data
Apr. 7, 2013   (CN) .......................... 2013 1 0117175

(51) Int. Cl.
*F21V 7/04* (2006.01)
*F21V 8/00* (2006.01)
*B29D 11/00* (2006.01)

(52) U.S. Cl.
CPC ...... *G02B 6/0055* (2013.01); *B29D 11/00663* (2013.01); *G02B 6/0065* (2013.01); *G02B 6/0068* (2013.01); *G02B 6/0053* (2013.01)

(58) Field of Classification Search
CPC ... G02B 6/0055; G02B 6/0068; G02B 6/0036
(Continued)

(56) References Cited

U.S. PATENT DOCUMENTS 7,252,425 B2   8/2007   Park
7,478,942 B2   1/2009   Kim et al.
(Continued)

FOREIGN PATENT DOCUMENTS

CN   1517724 A    8/2004
CN   1713047 A    12/2005
(Continued)

OTHER PUBLICATIONS

English Translation of the International Search Report of PCT/CN2013/077254 published in English on Oct. 16, 2014.
(Continued)

*Primary Examiner* — Peggy Neils
*Assistant Examiner* — William N Harris
(74) *Attorney, Agent, or Firm* — Collard & Roe, P.C.

(57) ABSTRACT

A method of manufacturing a light guiding plate comprises steps of forming a protrusion array composed of a plurality of protrusions (300) on a surface of a substrate (100); and forming reflective layers (301) on side facets of the protrusions (300) respectively, in such a way that, the farther away from a side of the substrate (100) the protrusion (300) with the reflective layer is, the greater the reflectivity of the reflective layer (301) is. The light emitted from the light guiding plate made by the method is relatively uniform, and the heating issue is also avoided.

19 Claims, 4 Drawing Sheets

(58) Field of Classification Search
USPC .......................................................... 362/613
See application file for complete search history.

(56) References Cited

U.S. PATENT DOCUMENTS

| | | | | |
|---|---|---|---|---|
| 7,771,104 | B2* | 8/2010 | Iwasaki | G02B 6/0041 |
| | | | | 362/612 |
| 8,421,954 | B1* | 4/2013 | Moon | G02B 6/0061 |
| | | | | 349/61 |
| 8,899,815 | B2* | 12/2014 | Chen | G02B 6/0016 |
| | | | | 362/606 |
| 9,638,853 | B2* | 5/2017 | Starkey | G02B 6/0036 |
| 2003/0043567 | A1* | 3/2003 | Hoelen | G02B 6/0068 |
| | | | | 362/613 |
| 2005/0213914 | A1* | 9/2005 | Fredley | G02B 6/0055 |
| | | | | 385/129 |
| 2007/0279727 | A1* | 12/2007 | Gandhi | G02B 6/0035 |
| | | | | 359/242 |
| 2008/0019150 | A1* | 1/2008 | Park | G02B 6/006 |
| | | | | 362/621 |
| 2008/0304155 | A1 | 12/2008 | Endoh et al. | |
| 2010/0053064 | A1* | 3/2010 | Hamada | G09G 3/3413 |
| | | | | 345/102 |
| 2010/0302218 | A1 | 12/2010 | Bita et al. | |
| 2011/0001693 | A1 | 1/2011 | Kim et al. | |
| 2011/0032452 | A1 | 2/2011 | Takata | |
| 2012/0120680 | A1 | 5/2012 | Fang et al. | |

FOREIGN PATENT DOCUMENTS

| | | |
|---|---|---|
| CN | 101900301 A | 12/2010 |
| CN | 101932968 A | 12/2010 |
| CN | 102016391 A | 4/2011 |
| CN | 102901051 A | 1/2013 |
| CN | 102943980 A | 2/2013 |
| JP | 2000-019357 A | 1/2000 |
| JP | 2008027689 A | 2/2008 |

OTHER PUBLICATIONS

Rejection Decision of Chinese Application No. 201310117175.6, dated Apr. 3, 2015 with English translation.
English translation of the International Preliminary Report on Patentability and Written Opinion of the International Searching Authority of PCT/CN2013/077254, dated Oct. 13, 2015.
Chinese Office Action of Chinese Application No. 201310117175.6, dated Jun. 5, 2014.
Chinese Office Action of Chinese Application No. 201310117175.6 with English translation, dated Oct. 27, 2014.
International Search Report, International Preliminary Report on Patentability and Written Opinion of the International Searching Authority of PCT/CN2013/077254 in Chinese, dated Jan. 23, 2014.
European Search Report in European Application No. 13854236.0 dated Dec. 1, 2016.

* cited by examiner

LIGHT GUIDING PLATE AND METHOD FOR MANUFACTURING THE SAME AND BACKLIGHT SOURCE AND DISPLAY DEVICE COMPRISING THE SAME

CROSS REFERENCE TO RELATED APPLICATIONS

This application is the National Stage of PCT/CN2013/077254 filed on Jun. 14, 2013, which claims priority under 35 U.S.C. §119 of Chinese Application No. 201310117175.6 filed on Apr. 7, 2013, the disclosure of which is incorporated by reference.

FIELD

The present disclosure relates to a light guiding plate and a method of manufacturing a light guiding plate, and a backlight unit and display device comprising a light guiding plate.

BACKGROUND

In a Thin Film Transistor liquid crystal display (TFT LCD), light emitting diodes (LED) of the backlight unit (BLU) provide a light source, and lights from the light source are diffused in a light guiding plate (LGP), such that the TFT LCD presents an image with an overall uniform brightness. The LCD can be operated in a field sequential control (FSC) mode. In such an operation mode, lights with red, green, blue colors are emitted in turns based on time, so as to drive the LCD accordingly to eventually regulate a final color, thereby improving efficiency. However, in such a FSC mode, it is required that several groups of LEDs with different colors emit lights in turns in a time sharing or a zone sharing manner based on control signals, thus achieving different colors respectively after light-blending. Here, the arrangement and positions of the LEDs for each color are of great importance.

SUMMARY

The present disclosure proposes a light guiding plate enabling uniform light emission and low heat emission.

One aspect of the present disclosure discloses a method of manufacturing a light guiding plate comprising steps of: forming a protrusion array composed of a plurality of protrusions on a surface of a substrate; and forming reflective layers on side facets of the protrusions respectively, in such a way that, the farther away from a side of the substrate the protrusion with the reflective layer is, the greater the reflectivity of the reflective layer is.

In one example, the step of forming reflective layers on the side facets of the protrusions comprises: step one, forming a photoresist on a surface of the protrusion array and planarizing the photoresist; step two, ashing the photoresist so that only the photoresist between the two adjacent protrusions remains, the remaining photoresist has a thickness less than a height of the protrusion; step three, forming reflective material films on the surface of the protrusions at row n or at column n, stripping the remaining photoresist at recesses between the protrusions at row n or at column n, and the reflective layers on the side facets and the top facet of the protrusions at row n or at column n remain; repeating the step three until all N rows or N columns of protrusions are formed with reflective layers on the side facets and the top facet of the protrusions, and the reflective layer of the reflective protrusion at row $n_i$ or at column $n_i$ further away from the side of the substrate has a greater reflectivity than that of the reflective layer of the reflective protrusion at row $n_j$ or at column $n_j$ closer to the side of the substrate, $1 \leq n_i < N$, $1 < n_j \leq N$, where N is the total number of the rows or columns of the reflective protrusions, i means the ith group of reflective protrusions comprising the reflective protrusions at row $n_i$ or at column $n_i$, j means the jth group of reflective protrusions comprising the reflective protrusions at row $n_j$ or at column $n_j$; and step four, removing the reflective material film on the top facets of the protrusions.

In one example, the step of forming reflective layers on the side facets of the protrusions comprises: step one, forming a photoresist on the surface of the substrate formed with the protrusions; step two, exposing and developing the photoresist on the facets of the protrusions at row n or at column n, so as to expose only predefined side facets of the protrusions facing the side of the substrate; step three, forming reflective material films on the exposed predefined side facets of the protrusions at row n or at column n; step four, repeating the step two and the step three, until all N rows or N columns of protrusions are formed with the reflective layers on the predefined side facets facing the side of the substrate, and the reflective layer of the reflective protrusion at row $n_i$ or at column $n_i$ further away from the side of the substrate has a greater reflectivity than that of the reflective layer of the reflective protrusion at row $n_j$ or at column $n_j$ closer to the side of the substrate, $1 \leq n_i < N$, $1 < n_j \leq N$, N is the total number of the rows or the columns of the protrusions, i means the ith group of reflective protrusions comprising the reflective protrusions at row $n_i$ or at column $n_i$, j means the jth group of reflective protrusions comprising the reflective protrusions at row $n_j$ or at column $n_j$; and step five, stripping the remaining photoresist.

In one example, a light source is provided at the side of the substrate.

In one example, the light sources of different colors are provided at different sides of the substrate.

In one example, for the light source of identical color, the reflective layers on the side facets of the protrusions facing the light source have an increasing reflectivities or reflectiveness as the distance between the protrusions and the light sources increases.

In one example, the protrusion has a hexahedron shape, a lower facet and a top facet of the protrusion are parallel to the surface of the substrate, four side facets are inclined, the lower facet has an area greater than that of the upper facet.

Another aspect of the present disclosure provides a light guiding plate made by the above method.

Still another aspect of the present disclosure provides a backlight unit comprising the above light guiding plate.

Yet another aspect of the present disclosure provides a display device comprising the above backlight unit. In the light guiding plate according to the present disclosure, the further away from the light source the reflective protrusion on which the reflective facet is disposed is, the greater the reflectivity of the reflecting surface is, so that the light emitted from the light guiding plate is relatively uniform. According to the present disclosure, the light sources is distributed at the periphery of the light guiding plate, so that the heat emission is low, thus avoiding the heating issue of aggregating the light sources at the same location for enabling uniform emitted lights.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

In order to describe the technical solutions of the present disclosure more clearly, accompanying drawings in the description of the technical solutions according to the present disclosure will be described briefly. The drawings described as below are just schematic views illustrating a part of the specific embodiments of the technical solutions of the present disclosure, while the ordinary skilled in this art may also obtain other drawings based on these drawings without any creative works.

DETAILED DESCRIPTION OF THE PREFERRED EMBODIMENTS

In the following, the technical solutions of the embodiments of the present disclosure will be described fully and more clearly in conjunction with the drawings of the embodiments of the present disclosure, and the described embodiments are only part of the embodiments of the present disclosure, rather than all of the embodiments. Based on the embodiments of the present disclosure, all the other embodiments obtained by the ordinary skilled in this art without any creative endeavors fall into the protective scope of the present disclosure.

Unless defined otherwise, the technical terms or scientific terminology being used should take the meaning usually understood by the ordinary skilled in this art of present disclosure. The "first", "second" and similar words used in the description and claims of the present application does not denote any sequence, quantity or importance, but are used for distinguishing different components. Also, "one" or "a(an)" and similar words do not mean quantitative restriction, but refer to the presence of at least one. The "Coupling" or "coupled with" and similar words are not limited to physical or mechanical connections, but may comprise electrical connection, no matter directly or indirectly. The words "upper", "lower", "left", "right" and the like are only used to denote a relative positional relationship, and when the described object is changed in its absolute position, this relative positional relationship is also changed accordingly.

First Embodiment

This embodiment provides a method of manufacturing a light guiding plate and a light guiding plate made by this method. The method comprises the following steps.

Figure 1:
FIGS. 1-6 are a schematic section views of a light guiding plate in respective steps in a method of manufacturing the light guiding plate according to the embodiment of the present disclosure.

Step one, an array of a plurality of protrusions is formed on a surface of the substrate 100, as shown in FIG. 1.

Step two, a reflective layer is formed on facets of the protrusions facing a predetermined light source of a backlight unit in which the light guiding plate is arranged, in a such way that the farther away from the light source the protrusion with the reflective layer is, the greater the reflectivity of the reflective layer is. This step comprises following steps in particular.

Figure 2:
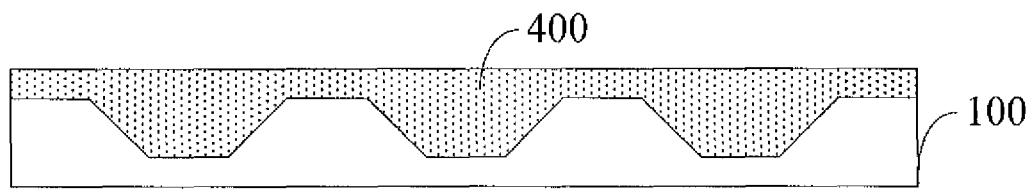

Step 21, as shown in FIG. 2, a photoresist 400 is formed on a top surface of the array of protrusions, and is planarized.

Step 22, the photoresist 400 is ashed so that only the photoresist between the two adjacent protrusions remains, and the remaining photoresist 400 has a thickness less than a height of the protrusion.

Figure 3:
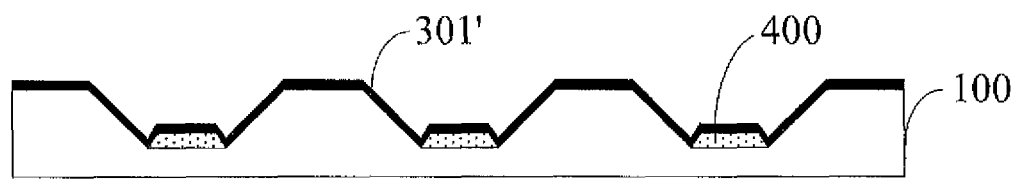
Figure 4:
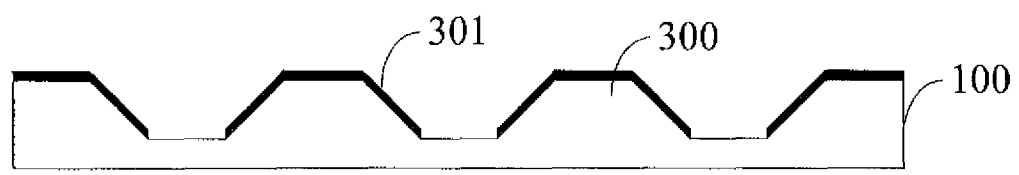

Step 23, as shown in FIG. 3, a reflective material film 301' for example a metallic film with a certain reflectivity is formed on the remaining photoresist 400 and on the surfaces of the protrusions at row n or at column n. Then, as shown in FIG. 4, the photoresist 400 remaining between the protrusions at row n or at column n is stripped off, so that reflective layers 301 are formed on the top and side facets of the protrusions at row n or at column n, thereby forming reflective protrusions 300.

The above step 23 is repeated for several times, until all N rows or N columns of protrusions on the surface of the substrate 100 are formed with reflective layers on the side and top facets thereof, and the reflective layer of the reflective protrusions 300 at row $n_i$ or at column $n_i$ which are further away from the light source than the reflective protrusions 300 at row $n_j$ or at column $n_j$ has a greater reflectivity than that of the reflective layer of the reflective protrusion 300 at row $n_j$ or at column $n_j$, $1 \leq n_i < N$, $1 < n_j \leq N$, is the total number of the rows or columns of the reflective protrusions, i means the ith group of reflective protrusions comprising the reflective protrusions at row $n_i$ or at column $n_i$, j means the jth group of reflective protrusions 300 comprising the reflective protrusions 300 at row $n_j$ or at column $n_1$.

Figure 5:
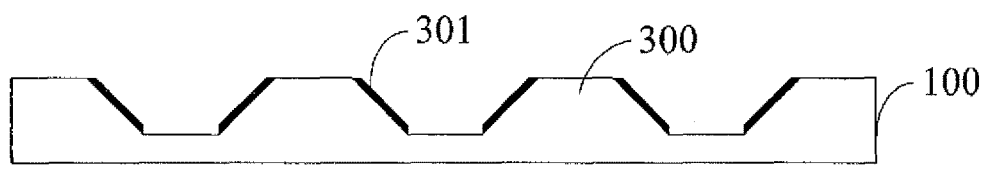

As shown in FIG. 5, after forming the reflective protrusions 300, the reflective material film on the top facet of the reflective protrusions 300 could be removed, and only the reflective material on the side facets of the reflective protrusion 300 remains, so as to prevent the reflective film on the top facet from reflecting lights.

Figure 6:
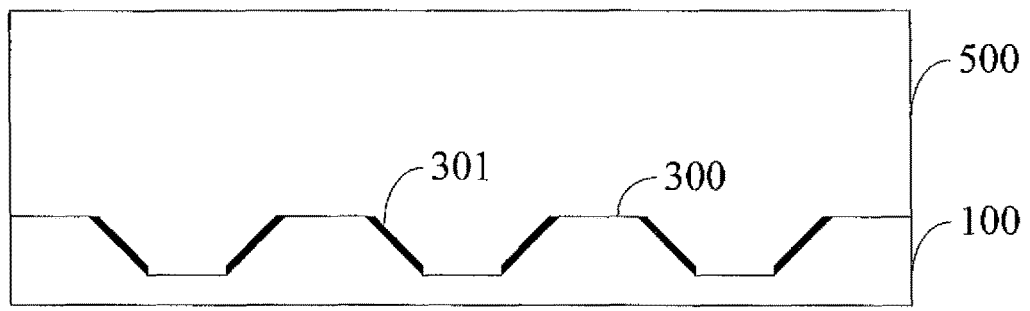
Figure 7:
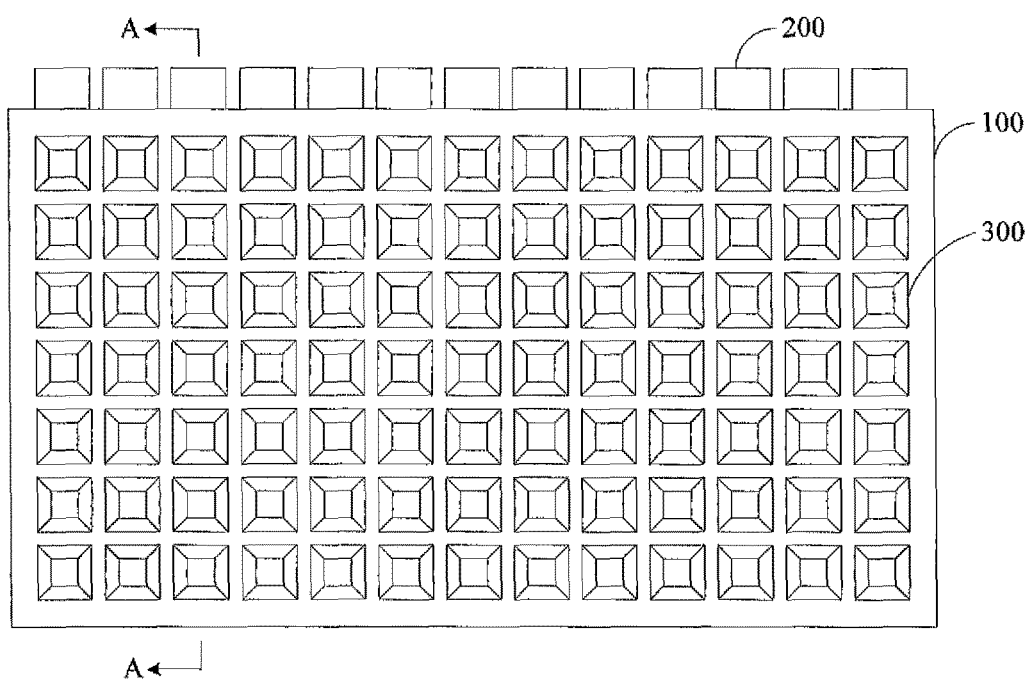
FIG. 7 is a schematic plan view of a light guiding plate according to the embodiment of the present disclosure.
Figure 8:
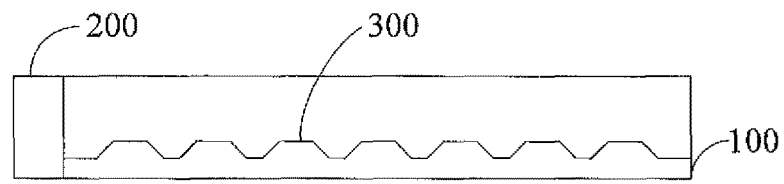
FIG. 8 is a schematic section view taken along the line A-A of FIG. 7.

Step three, as shown in FIG. 6, a transparent protective layer 500 is formed on the surface of the substrate 100 so as to form a light guiding plate. Light sources 200 are provided on a side face of the substrate 100 and the protective layer 500, as shown in FIGS. 7 and 8. The light sources 200 may be arranged to face toward the reflective facet of the reflective protrusions of the light guiding plate.

The light guiding plate made by the above method comprises a substrate 100 of the light guiding plate, and an array of reflective protrusions 300 comprising reflective facets arranged on a surface of the substrate 100. Light sources 200 are arranged on at least one side of the substrate 100. The farther away from the light source 200 the reflective protrusion 300 with the reflective facet is, the greater the reflectivity of the reflective facet is.

Figure 9:
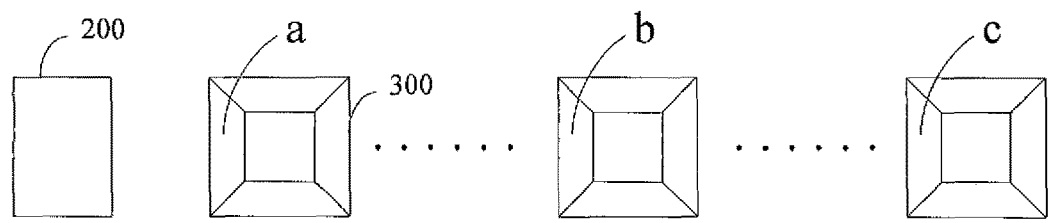
FIG. 9 is a schematic view showing reflectivity variation of reflective facets of reflective protrusions in the light guiding plate shown in FIG. 7.

As shown in FIG. 9, the light source 200 is arranged on the left side of the substrate 100. In this case, the left side facet of the reflective protrusion 300 facing the light source 200 can be a reflective facet, which can be formed by applying a reflecting material on the left side facet of the reflective protrusions 300. Since lights are incident from the left side, the farther away from the light source 200, the weaker the light intensity is. In order to obtain an uniform light emission, the left side facets of the reflective protrusions 300 in a direction from left to right have reflectivity a, b, and c, respectively, which satisfy a<b<c.

It is sufficient that the side facet of the reflective protrusion 300 facing the light source has a reflective layer, and the angle between the side facet and the bottom facet of the light guiding plate is 20°~60°, so that the lights after being reflected could emit as perpendicularly as possible. For example, the reflective protrusion 300 has a hexahedron shape. As shown in FIG. 9, two faces of the hexahedron parallel to the top surface of the light guiding-plate are the bottom facet and the top facet, respectively. The bottom facet has an area greater than that of the top facet. All the other four side faces are inclined side facets. The side facet facing the light source is the reflective facet. The light source 200 may be a monochromatic source, for example, a red, green, blue or white LED light source.

According to the light guiding plate in this embodiment, lights incident from one side of the light guiding plate according to the present disclosure can have an uniform emergent light intensity.

Second Embodiment

This embodiment provides another method of manufacturing a light guiding plate and a light guiding plate made by this method. The method comprises the following steps.

Step one, an array of a plurality of protrusions is formed on a surface of the substrate 100, as shown in FIG. 1.

Step two, a reflective layer is formed on facets of the protrusions facing a predetermined light source of a backlight unit in which the light guiding plate is arranged, in a such way that the farther away from the light source the protrusion with the reflective layer is, the greater the reflectivity of the reflective layer is. This step comprises following steps in particular.

Step 21, a photoresist is formed on the surfaces of the substrate.

Step 22, the photoresist is exposed and developed on the surfaces of the protrusions at row n or at column n, so as to expose a side face facing the predetermined light source.

Step 23, a reflective material film of predetermined reflectivity is formed on the exposed surfaces of the protrusions at row n or at column n.

Step 24, the steps 22 and 23 are repeated, until the N rows or N columns of protrusions are formed with reflective layers at sides thereof facing the predefined light source, and the reflective layer of the protrusions at row $n_i$ or at column $n_i$ which are further away from the light source than the reflective protrusions at row $n_j$ or at column $n_j$ has a greater reflectivity than that of the reflective layer of the reflective protrusion at row $n_j$ or at column $n_j$, $1 \leq n_i < N$, $1 < n_j \leq N$, N is the total number of the rows or columns of the reflective protrusions, means the ith group of reflective protrusions comprising the reflective protrusions at row $n_i$ or at column $n_i$, j means the jth group of reflective protrusions 300 comprising the reflective protrusions 300 at row $n_j$ or at column $n_j$.

The side of the protrusions facing another predetermined light source is subjected to the above steps 21 to 24, until all the sides of each protrusion facing a predetermined light source are formed with reflective layers.

The remaining photoresist is stripped, and resultant reflective protrusions are formed.

Step three, a transparent protective layer is formed, and a light source is provided at the side opposite to the reflective layer.

Figure 10:
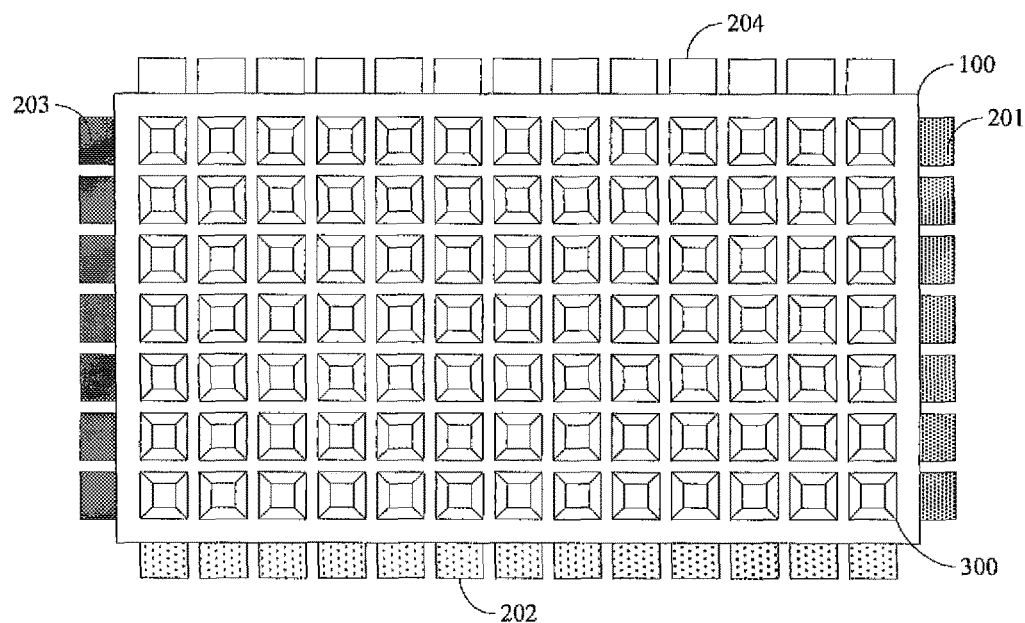
FIG. 10 is a schematic plan view of another light guiding plate according to the embodiment of the present disclosure.

In the present embodiment, FIG. 10 is a schematic plan view of a light guiding plate formed according to the above methods. As shown in FIG. 10, red light sources 201, green light sources 202 and blue light sources 203 are provided at three sides surfaces perpendicular to the top surface of the substrate 100. Optionally, white light sources 204 can be further arranged at one additional side.

For example, the reflective protrusion 300 has a hexahedron shape. As shown in FIG. 9, two faces of the hexahedron parallel to the top surface of the light guiding-plate are the bottom facet and the top facet, respectively. The bottom facet has an area greater than that of the top facet. All the other four side facets are inclined side facets. All four side facets of the hexahedron facing the light sources are reflective surfaces so as to reflect the lights from the red light source 201, the green light source 202, the blue light source 203 and the white light source 204, respectively. For example, the four side facets of the hexahedron have equal inclined angle with respect to the bottom facet in a range between 20° and 60°, such that the emitted lights for each color is more uniform.

Figure 11:
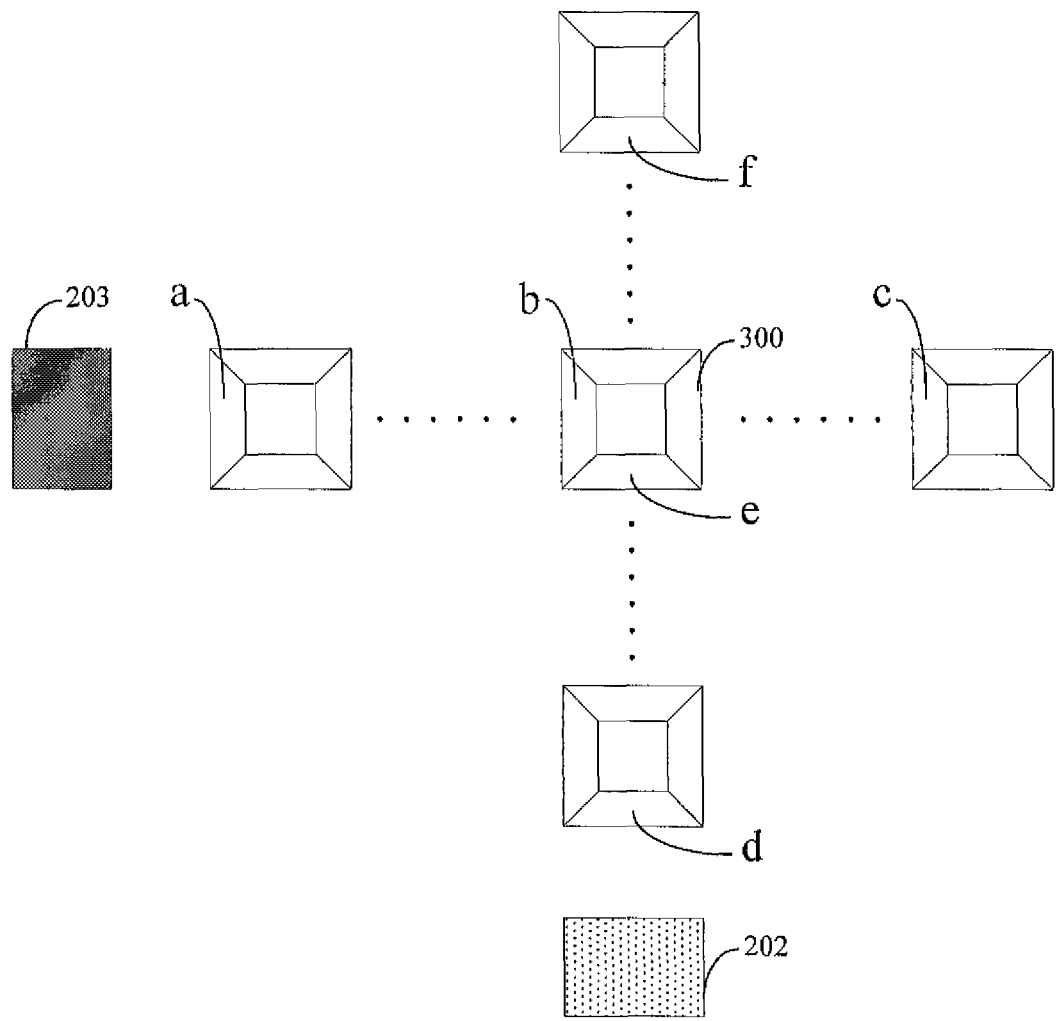
FIG. 11 is a schematic view showing reflectivity variation of reflective facets of reflective protrusions in the light guiding plate shown in FIG. 10.

As shown in FIG. 11, for the light source of each color, the side facet of each reflective protrusion 300 facing the light source is a reflective facet, and the reflectivity of facet is increased with the increased distance from the light source. For example, the reflectivity d, e and f of the respective reflective facets of the reflective protrusion 300 correspondingly facing the green light source 202 satisfy the following relationship: d<e<f, and the reflectivity a, b and c of the respective reflective facets of the reflective protrusion 300 correspondingly facing the blue light source 203 satisfy the following relationship a<b<c. The reflective facets of each reflective protrusion 300 correspondingly facing the red and white light sources respectively have similar reflectivity relationship.

The light guiding plate made by the method of the present embodiment may allow arranging the light sources of different colors at different sides in the periphery of the light guiding plate, thus avoiding heat accumulation in case of arranging all light sources together to improve uniformity.

Third Embodiment

The present embodiment further provides a backlight unit and a display device comprising the backlight unit. The backlight unit comprises the light guiding plate according to the above first or second embodiment. The display device may be a liquid crystal panel, an electronic paper, a cellphone, a tablet, a television, a display, a notebook PC, a digital photo frame, an navigator and any other products or parts with display function.

The above embodiments are used only for explaining the examples of present disclosure, but not for limiting the examples of present disclosure. The skilled in the art can make various modifications and variations without departing from the spirit and scope of the examples of present disclosure, therefore all equivalent technical solutions fall into the scope of the examples of present disclosure, and the patent protective scope of the examples of present disclosure should be defined by claims.

What is claimed is:

1. A method of manufacturing a light guiding plate, comprising steps of:

forming a protrusion array including a plurality of protrusions on a surface of a substrate;

forming reflective layers on side facets of the protrusions respectively including first reflective layers on a first side facets of the protrusions and second reflective layers on second side facets of the protrusions, in such a way that, the farther away from a first side of the substrate the protrusions are, the greater reflectivity values of the first reflective layers are, and the farther away from a second side of the substrate the protrusions are, the greater reflectivity values of the second reflective layers are, wherein the first side facets and the second side facets of the protrusions are inclined with the surface of the substrate, the first side facets of the protrusions face the first side of the substrate, and the second side facets of the protrusions face the second side of the substrate.

2. The method of manufacturing the light guiding plate according to claim 1, wherein the step of forming reflective layers on the side facets of the protrusions comprises:

step one, forming a photoresist on a surface of the protrusion array and planarizing the photoresist;

step two, ashing the photoresist so that only the photoresist between the two adjacent protrusions remains, the remaining photoresist has a thickness less than a height of the protrusion;

step three, forming reflective material films on the surface of the protrusions at row n or at column n, stripping the remaining photoresist at recesses between the protrusions at row n or at column n, and the reflective layers on the side facets and the top facet of the protrusions at row n or at column n remain;

repeating the step three until all N rows or N columns of protrusions are formed with reflective layers on the side facets and the top facet of the protrusions, wherein the reflective layer of the reflective protrusion at row $n_i$ or at column $n_i$ further away from the side of the substrate has a greater reflectivity than that of the reflective layer of the reflective protrusion at row $n_j$ or at column $n_j$ closer to the side of the substrate, $1 \leq n_i < N$, $1 < n_j \leq N$, where N is the total number of the rows or columns of the reflective protrusions, i means the ith group of reflective protrusions comprising the reflective protrusions at row $n_i$ or at column $n_i$, j means the jth group of reflective protrusions comprising the reflective protrusions at row $n_j$ or at column $n_j$; and step four, removing the reflective material film on the top facets of the protrusions.

3. The method of manufacturing the light guiding plate according to claim 1, wherein the step of forming reflective layers on the side facets of the protrusions comprises:

step one, forming a photoresist on the surface of the substrate formed with the protrusions;

step two, exposing and developing the photoresist on the facets of the protrusions at row n or at column n, so as to expose only predefined side facets of the protrusions facing the side of the substrate;

step three, forming reflective material films on the exposed predefined side facets of the protrusions at row n or at column n;

step four, repeating the step two and the step three, until all N rows or N columns of protrusions are formed with the reflective layers on the predefined side facets facing the side of the substrate, and the reflective layer of the reflective protrusion at row $n_i$ or at column $n_i$ further away from the side of the substrate has a greater reflectivity than that of the reflective layer of the reflective protrusion at row $n_j$ or at column $n_j$ closer to the side of the substrate, $1 \leq n_i < N$, $1 < n_j \leq N$, N is the total number of the rows or the columns of the protrusions, i means the ith group of reflective protrusions comprising the reflective protrusions at row $n_i$ or at column $n_i$, j means the jth group of reflective protrusions comprising the reflective protrusions at row $n_j$ or at column $n_j$; and step five, stripping the remaining photoresist.

4. The method of manufacturing the light guiding plate according to claim 1, wherein a first light source is provided at the first side of the substrate and a second light source is provided at the second side of the substrate.

5. The method of manufacturing the light guiding plate according to claim 1, wherein light sources of different colors are provided at different sides of the substrate.

6. The method of manufacturing the light guiding plate according to claim 5, wherein for the light source of identical color, the reflective layers on the side facets of the protrusions facing the light source have increasing reflectivity values as distances between the protrusions and the light sources increase.

7. The method of manufacturing the light guiding plate according to claim 1, wherein each protrusion has a hexahedron shape, a lower facet and a top facet of the protrusions are parallel to the surface of the substrate, four side facets are inclined, the lower facet has an area greater than that of the upper facet.

8. A light guiding plate comprising:

a substrate; and a protrusion array including a plurality of protrusions on a surface of the substrate;

wherein the protrusions are formed with reflective layers on side facets thereof respectively including first reflective layers on a first side facets of the protrusions and second reflective layers on second side facets of the protrusions, in such a way that, the farther away from a first side of the substrate the protrusions are, the greater reflectivity values of the first reflective layers are, and the farther away from a second side of the substrate the protrusions are, the greater reflectivity values of the second reflective layers are; and wherein the first side facets and the second side facets of the protrusions are inclined with the surface of the substrate, the first side facets of the protrusions face the first side of the substrate, and the second side facets of the protrusions face the second side of the substrate.

9. A backlight unit comprising: a light guiding plate comprising:

a substrate; and a protrusion array including a plurality of protrusions on a surface of the substrate;

wherein the protrusions are formed with reflective layers on side facets thereof respectively including first reflective layers on a first side facets of the protrusions and second reflective layers on second side facets of the protrusions, in such a way that, the farther away from a first side of the substrate the protrusions are, the greater reflectivity values of the first reflective layers are, and the farther away from a second side of the substrate the protrusions are, the greater reflectivity values of the second reflective layers are; and wherein the first side facets and the second side facets of the protrusions are inclined with the surface of the substrate, the first side facets of the protrusions face the first side of the substrate, and the second side facets of the protrusions face the second side of the substrate.

10. The light guiding plate according to claim 8, wherein a first light source is provided at the first side of the substrate and a second light source is provided at the second side of the substrate.

11. The light guiding plate according to claim 8, wherein light sources of different colors are provided at different sides of the substrate.

12. The light guiding plate according to claim 11, wherein for the light source of identical color, the reflective layers on the side facets of the protrusions facing the light source have increasing reflectivity values as distances between the protrusions and the light sources increase.

13. The light guiding plate according to claim 8, wherein each protrusion has a hexahedron shape, a lower facet and a top facet of the protrusions are parallel to the surface of the substrate, four side facets are inclined, the lower facet has an area greater than that of the upper facet.

14. The light guiding plate according to claim 10, wherein each protrusion has a hexahedron shape, a lower facet and a top facet of the protrusions are parallel to the surface of the substrate, four side facets are inclined, the lower facet has an area greater than that of the upper facet.

15. The light guiding plate according to claim 11, wherein each protrusion has a hexahedron shape, a lower facet and a top facet of the protrusions are parallel to the surface of the substrate, four side facets are inclined, the lower facet has an area greater than that of the upper facet.

16. The light guiding plate according to claim 12, wherein each protrusion has a hexahedron shape, a lower facet and a top facet of the protrusions are parallel to the surface of the substrate, four side facets are inclined, the lower facet has an area greater than that of the upper facet.

17. The backlight unit according to claim 9, wherein a first light source is provided at the first side of the substrate and a second light source is provided at the second side of the substrate.

18. The backlight unit according to claim 9, wherein light sources of different colors are provided at different sides of the substrate.

19. The backlight unit according to claim 18, wherein for the light source of identical color, the reflective layers on the side facets of the protrusions facing the light source have increasing reflectivity values as distances between the protrusions and the light sources increase.

* * * * *